US011894661B2

(12) United States Patent
Parkin et al.

(10) Patent No.: US 11,894,661 B2
(45) Date of Patent: Feb. 6, 2024

(54) ELECTRICAL SWITCHING ARRANGEMENT

(71) Applicant: FIRST LIGHT FUSION LIMITED, Yarnton (GB)

(72) Inventors: James Parkin, Yarnton (GB); Thomas Clayson, Yarnton (GB); Jamie Darling, Yarnton (GB); Paul Holligan, Yarnton (GB)

(73) Assignee: First Light Fusion Limited

( * ) Notice: Subject to any disclaimer, the term of this patent is extended or adjusted under 35 U.S.C. 154(b) by 7 days.

(21) Appl. No.: 17/794,505

(22) PCT Filed: Jan. 22, 2021

(86) PCT No.: PCT/GB2021/050145

§ 371 (c)(1),
(2) Date: Jul. 21, 2022

(87) PCT Pub. No.: WO2021/148801

PCT Pub. Date: Jul. 29, 2021

(65) Prior Publication Data

US 2023/0057422 A1 Feb. 23, 2023

(30) Foreign Application Priority Data

Jan. 24, 2020 (GB) ..................................... 2001055

(51) Int. Cl.
*H01T 2/02* (2006.01)
*H01T 4/16* (2006.01)

(52) U.S. Cl.
CPC *H01T 2/02* (2013.01); *H01T 4/16* (2013.01)

(58) Field of Classification Search
CPC ......... H01T 13/32; H01T 13/36; H01T 13/40; H01T 13/38; H01T 13/34; H01T 13/41;
(Continued)

(56) References Cited

U.S. PATENT DOCUMENTS 4,092,559 A 5/1978 Dashuk
2019/0141825 A1* 5/2019 Cho ........................ H01G 2/14

FOREIGN PATENT DOCUMENTS

CA 654914 A 1/1963
FR 2149599 A5 3/1973
(Continued)

OTHER PUBLICATIONS

Kovalchuk, B.M. et al., "Pulse generators based on air-insulated linear-transformer-driver stages," Physical Review Special Topics—Accelerators and Beams, vol. 16, May 2013, American Physical Society, 8 pages.
(Continued)

*Primary Examiner* — Bryan R Perez
(74) *Attorney, Agent, or Firm* — Withrow & Terranova, PLLC; Vincent K. Gustafson

(57) ABSTRACT

An electrical switching arrangement for an electrical power supply includes a live conductor. The live conductor includes electrodes for switching between first and second sides of the live conductor. The electrical switching arrangement also includes a ground conductor, an insulation block between the electrodes and the ground conductor, a first insulation member extending from the insulation block on the first side of the electrodes, and a second insulation member extending from the insulation block on the second side of the electrodes. The insulation block includes a first groove in which an edge of the first insulation member is located and a second groove in which an edge of the second insulation member is located.

16 Claims, 2 Drawing Sheets

Figure 1:
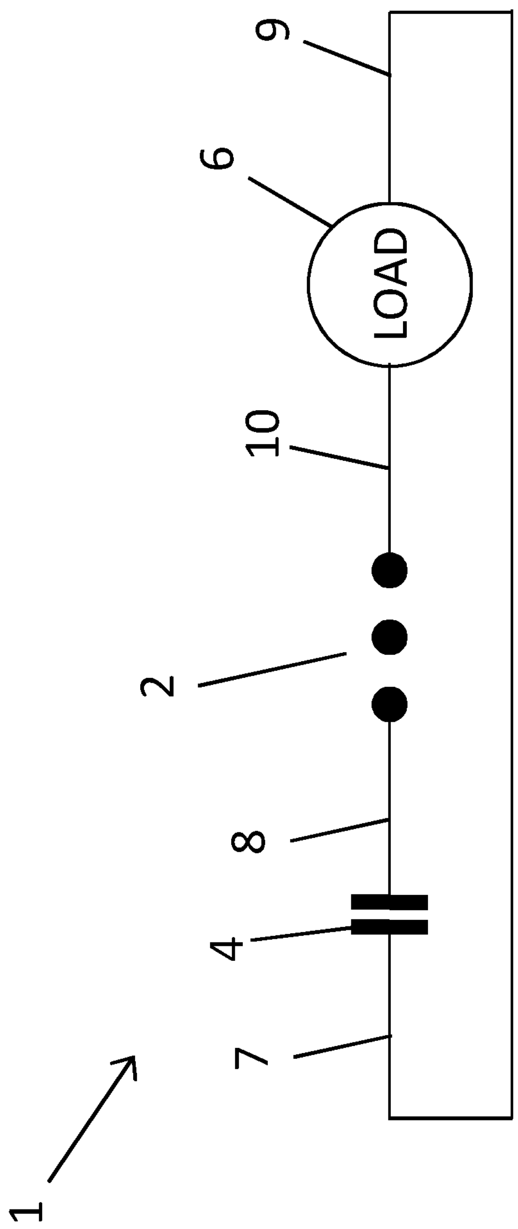

(58) Field of Classification Search
CPC ....... H01T 13/467; H01T 13/08; H01T 13/20; H01T 13/39; H01T 13/54; H01T 13/22; H01T 13/12; H01T 13/16; H01T 13/04; H01T 4/10; H01T 4/16; H01T 4/02–06
See application file for complete search history.

(56) References Cited

FOREIGN PATENT DOCUMENTS

| | | | |
|---|---|---|---|
| GB | 2438530 | A | 11/2007 |
| WO | 2006070082 | A1 | 7/2006 |

OTHER PUBLICATIONS

Lee, S. et al., “A simple facility for the teaching of plasma dynamics and plasma nuclear fusion,” American Journal of Physics, vol. 56, Jan. 1988, American Associated of Physics Teachers, 8 pages.
Search Report under Section 17 for United Kingdom Patent Application No. GB2001055.9, dated Mar. 23, 2020, 6 pages.
International Search Report and Written Opinion for International Patent Application No. PCT/GB2021/050145, dated Apr. 8, 2021, 14 pages.

* cited by examiner

ELECTRICAL SWITCHING ARRANGEMENT

This application is a 35 U.S.C. § 371 national phase filing of International Application No. PCT/GB2021/050145, filed on Jan. 22, 2021, and claims the benefit of United Kingdom Patent Application No. 2001055.9 filed on Jan. 24, 2020, wherein the entire contents of the foregoing applications are hereby incorporated by reference herein.

This invention relates to an electrical switching arrangement, in particular to an electrical switching arrangement for discharging a high voltage from a capacitor.

When providing a switch in a high voltage system, e.g. when discharging a high voltage from a capacitor, a switching device such as a spark gap may be used. An example of a spark gap is shown in GB 2 438 530 A.

In such a high voltage system, in order to provide reliable operation of the switching, an insulating spacer may be provided between the electrodes of the switch and between the different terminals (e.g. live and ground) of the high voltage system. When the voltages used are particularly high (e.g. >80 kV), it may be necessary to provide a significantly sized insulating spacer to prevent dielectric breakdown, e.g. by surface tracking.

However, when an insulating spacer is used, such that the electrodes of the switch and the different terminals of the high voltage system are separated from each other, this increases the inductance of the system owing to the volume of the insulating spacer causing the electrodes and terminals to be positioned further away from each other. This may be detrimental to the operation of the system, for example when particularly fast switching is desired, e.g. for use in a pulsed power system.

The amount of dielectric material (e.g. of the insulating spacer) provided is therefore a trade-off between the ability of the switching device to switch a high voltage rapidly and its ability to prevent dielectric breakdown at a high voltage.

An aim of the present invention is provide an improved electrical switching arrangement.

When viewed from a first aspect the invention provides an electrical switching arrangement for an electrical power supply, the electrical switching arrangement comprising:

- a live conductor, wherein the live conductor comprises a set of electrodes for switching between a first side of the live conductor and a second side of the live conductor;
- a ground conductor;
- an insulation block between the set of electrodes and the ground conductor;
- a first insulation member extending from the insulation block on the first side of the set of electrodes; and
- a second insulation member extending from the insulation block on the second side of the set of electrodes;
- wherein the insulation block comprises a first groove in which an edge of the first insulation member is located and a second groove in which an edge of the second insulation member is located.

The present invention provides an electrical switching arrangement for an electrical power supply, e.g. for switching between (connecting) a voltage source and a load. The switching arrangement includes a live conductor and a ground conductor. The live conductor includes a set of electrodes for switching between first and second sides of the live conductor, e.g. for switching between (connecting) the voltage source and the load. Thus the set of electrodes are provided between the first and second sides of the live conductor.

An insulation block (e.g. a backing plate) is positioned between the live conductor and the ground conductor, at the location of the set of electrodes. The insulation block includes two grooves in which two insulation members are located respectively. The insulation members extend from the insulation block on either side of the live conductor.

It will thus be appreciated that by providing an insulation block between the live conductor and the ground conductor helps reduce the risk of dielectric breakdown between the live conductor and the ground conductor, e.g. at high voltages, owing to the spacing of the conductors from each other by the insulation block. Such a risk may be particularly high (but reduced by the electrical switching arrangement of the present invention) when one side of the electrical switching arrangement (e.g. the first side, which may be connected to a voltage source) is being charged to a high voltage. Embodiments of the present invention therefore help the charge at a high voltage to be maintained during charging, while reducing the risk of dielectric breakdown.

The arrangement of the present invention also helps to reduce the inductance of the electrical switching arrangement, owing to the insulation members fitting into the respective grooves of the insulation block. This is because the grooves, with part of the insulation members located therein, help to reduce the risk of surface tracking across the face of the insulation block adjacent to the ground conductor, by acting as a trap for any surface tracking (it should be noted that in at least preferred embodiments the risk of dielectric breakdown directly across the set of electrodes is relatively low owing to the spacing of the electrodes and/or resistance in the switching arrangement). This may therefore allow the live conductor and the ground conductor to be brought closer together owing to not having to provide a (e.g. single) large insulation block for the purposes of reducing the risk of surface tracking, thus reducing the inductance.

The insulation members, extending outwards from the insulation block on both sides of the live conductor (and thus also for the opposing ground conductor), also help to reduce the risk of dielectric breakdown between the live conductor and the ground conductor, e.g. on the first side of the live conductor when a voltage source is being used to charge the live conductor over a period of time to a high voltage.

The electrical switching arrangement may be used with any suitable and desired power supply. Preferably the electrical switching arrangement is arranged to connect (and thus switch between) a voltage source and a load. The voltage source preferably comprises (e.g. an array of) one or more capacitors, arranged to be charged to store a charge at a voltage. Preferably the one or more capacitors are connected to the electrical switching arrangement and arranged to discharge a voltage through the electrical switching arrangement.

Preferably the live conductor of the electrical switching arrangement is connected to the live terminal of the voltage source (e.g. of the capacitor). In one set of embodiments the live conductor of the electrical switching arrangement is connected to a live output terminal (e.g. plate) of (e.g. a capacitor header) of a capacitor. The first side of the live conductor may, for example, comprise (or be an extension of) a live output terminal (e.g. a live output plate) of a capacitor. The live conductor, live terminal and the live output terminal (as well as any other live components connected thereto) may be at either a positive or a negative voltage relative to the respective ground components of the switching arrangement.

Similarly, in one set of embodiments the ground conductor of the electrical switching arrangement is connected to a ground output terminal of the voltage source, e.g. to a ground output terminal (e.g. plate) of (e.g. a capacitor header) of a (e.g. same or different) capacitor. The first side of the ground conductor may, for example, comprise (or be an extension of) a ground output terminal (e.g. a ground output plate) of a capacitor.

The invention extends to the electrical power supply per se and thus when viewed from a further aspect the invention provides an electrical power supply for supplying an output voltage to a load, the electrical power supply comprising:

- one or more capacitors for generating a voltage, wherein the one or more capacitors comprise:
  - a live terminal and a ground terminal; and
- an electrical switching arrangement for connecting the voltage generated by the one or more capacitors to the load, wherein the electrical switching arrangement comprises:
  - a live conductor connected to the live terminal of the capacitor, wherein the live conductor comprises a set of electrodes for switching between a first side of the live conductor and a second side of the live conductor;
  - a ground conductor connected to the ground terminal of the capacitor;
  - an insulation block between the set of electrodes and the ground conductor;
  - a first insulation member extending from the insulation block on the first side of the set of electrodes; and
  - a second insulation member extending from the insulation block on the second side of the set of electrodes;
  - wherein the insulation block comprises a first groove in which an edge of the first insulation member is located and a second groove in which an edge of the second insulation member is located.

It will be appreciated that this aspect of the invention may (and preferably does) include one or more (e.g. all) of the preferred and optional features outlined herein.

The (e.g. voltage source of the) electrical power supply may be arranged to generate, and the electrical switching arrangement may be arranged to switch, any suitable and desired voltage and/or current, e.g. to a load. Preferably the electrical power supply is arranged to generate, and the electrical switching arrangement is arranged to switch, a voltage of at least 30 kV, e.g. at least 50 kV, e.g. approximately 60 kV.

The electrical switching arrangement and the electrical power supply may be used to switch and supply an output voltage for any suitable and desired use, e.g. to a load. Thus preferably the electrical switching arrangement is used to connect (i.e. conduct) the two sides of the live conductor, e.g. to discharge a voltage from (e.g. a voltage source on) the first side of the live conductor to the second side of the live conductor, e.g. to deliver the voltage to a load.

In one set of embodiments the electrical switching arrangement and the electrical power supply is used to deliver a high voltage and current pulse to a load in a vacuum chamber, e.g. as part of a pulsed power system. The Applicant has also recognised that electrical switching arrangement and the electrical power supply may be used in any (e.g. high) voltage power system in which the terminals (conductors) are spatially close and likely to have a large voltage difference across them. This may include, for example, electricity mains switches for power applications that desire lower inductance and a compact high voltage switch design.

The live conductor and the ground conductor may have any suitable and desired geometry. In a set of embodiments the live conductor comprises a live conducting plate and the ground conductor comprises a ground conducting plate. Preferably the live conducting plate and the ground conducting plate are (e.g. extended) substantially parallel to each other, e.g. with the insulation block and the first and second insulation members lying between the conducting plates.

The live conductor and the ground conductor may be formed from any suitable and desired (e.g. conductive) material. In one embodiment the live conductor and/or the ground conductor are formed from metal, e.g. aluminium.

The live conductor has a first side and a second side. Thus preferably the live conductor extends on each side of the set of electrodes (and thus of the electrical switching arrangement). Preferably one or each side of the live conductor comprises a live conducting plate. Preferably the ground conductor extends (e.g. continuously) through (and, e.g., on both sides of) the set of electrodes (and thus of the electrical switching arrangement).

The set of electrodes, for switching between (i.e. providing a conducting connection) the first and second sides of the live conductor, may be provided in any suitable and desired way. In one set of embodiments the set of electrodes comprises a spark (e.g. ball) gap. Preferably the set of electrodes comprises an array of spark ball gaps (e.g. a multi-channel ball gap switch), e.g. extending between the first and second sides of the live conductor and/or extending along the first and second sides of the live conductor.

In a set of embodiments the electrical switching arrangement comprises a trigger arranged to initiate the switching of (e.g. conducting across) the set of electrodes. Preferably the trigger is arranged to perturb the electric field within the electrical switching arrangement, which causes an electrical breakdown to cascade, thus completing an electric circuit through the set of electrodes.

The insulation block between the set of electrodes and the ground conductor may be provided in any suitable and desired way. In a set of embodiments the insulation block extends across (and, e.g., beyond) the set of electrodes between the first and second sides of the live conductor. Preferably the insulation block has a thickness (in the direction between the set of electrodes and the ground conductor) that is less than a length (in the direction across the set of electrodes) and/or a width (in the direction perpendicular to the thickness and the length) of the insulation block. Thus preferably the insulation block is substantially planar. The insulation block preferably has a length of between 30 cm and 50 cm, e.g. between 35 cm and 45 cm, e.g. approximately 40 cm. The insulation block preferably has a width of between 20 cm and 40 cm, e.g. between 25 cm and 35 cm, e.g. approximately 30 cm. Thus preferably the insulation block has a length and/or a width greater than or equal to the corresponding dimension(s) of the set of electrodes.

The insulation block may be substantially cuboid; however, in a set of embodiments the edges of the insulation block (e.g. on the first and second sides of the live conductor) are tapered in a direction towards the respective edges, e.g. between the grooves and the respective edges of the insulation block where the insulation members overlap with the insulation block. The tapering of the insulation block may help to reduce the inductance of the electrical switching arrangement.

In one set of embodiments the insulation block has a thickness at an edge of the insulation block proximal to the first side of the set of electrodes (which, e.g., is connected to a voltage source and thus in use is charged to a high voltage) that is greater than a thickness at an edge of the insulation block proximal to the second side of the set of electrodes. This helps to increase the reliability and the safety factor of the electrical switching arrangement (while not necessarily increasing its inductance) because the insulation provided is greater where the electric field gradient is larger (i.e. on the first (high voltage) side of the set of electrodes), while being able to be reduced on the second side of the set of electrodes where the electric field gradient is smaller.

Thus preferably the thickness of the insulation block increases across the insulation block in a direction parallel to the direction from the second side of the set of electrodes to the first set of electrodes. Preferably the insulation block is substantially wedge-shaped, e.g. having a substantially triangular cross-section (e.g. in a plane perpendicular to the width of the insulation block).

The insulation block may be formed from any suitable and desired dielectric material. Preferably the insulation block comprises a solid (e.g. substantially incompressible, e.g. rigid) block. In a set of embodiments the insulation block is formed from plastic, e.g. a thermoplastic. Preferably the insulation block member is formed from polyethylene (PE). PE has a relatively high stiffness and dielectric strength, and a good dimensional stability. This helps to provide good insulation and structural integrity in the electrical switching arrangement, particularly when a high voltage is switched through the electrical switching arrangement.

The first and second insulation members may be formed in any suitable and desired way to extend from, and to fit in the respective grooves of, the insulation block. The first and second insulation members may each be formed from a solid (e.g. substantially rigid) block of material (e.g. made from the same material as the insulation block) that is shaped (e.g. with an angle at the edge of the block of material) to fit into the respective groove in the insulation block. The first and second insulation members, e.g. in a similar manner to the insulation block, may be substantially planar (e.g. apart from the edge that fits into the groove), e.g. having a thickness between 1 mm and 2 mm.

However, in a preferred set of embodiments, the first and second insulation members comprise a first set of one or more insulation sheets and a second set of one or more insulation sheets. Providing (e.g. flexible) sheets of insulation both helps to fit the sheets into the respective grooves of the insulation block and to reduce the thickness of the combined insulation block and insulation sheets, thus reducing the inductance of the electrical switching arrangement.

The first and second sets of one or more insulation sheets may be inserted into and secured in the respective grooves of the insulation member in any suitable and desired way. Preferably the insulation sheet(s) are folded and tucked into the respective grooves. Having the insulation sheet(s) folding back on itself, against the electric field gradient, helps to prevent charge from migrating to and around the insulation block, thus helping to reduce the risk of surface tracking. Preferably the insulation sheet(s) are secured in the respective grooves by adhesive tape.

The first and second grooves in the insulation block may be shaped and sized in any suitable and desired way for receiving the respective insulation members. In a set of embodiments the grooves are formed in the side of the insulation block facing the ground conductor (i.e. opposite the set of electrodes and the live conductor). Preferably the grooves are formed towards the respective edges (e.g. closer to the edge than the centre) of the insulation block (e.g. the edges in the directions in which the first and second sides of the live conductor extend respectively).

In a set of embodiments the grooves extend (e.g. substantially all the way across the insulation block) in a direction perpendicular to the directions in which the first and second sides of the live conductor extend from the set of electrodes. This helps to reduce the risk of any surface tracking occurring as the grooves extend perpendicularly to the direction in which surface tracking may occur. Preferably the grooves are aligned with the respective edges of the sides of the live conductor, proximal to the set of electrodes. When the set of electrodes comprises an array of spark ball gaps, preferably the grooves are aligned with the row of balls closest to the respective side of the live conductor.

The grooves may extend into the insulation block at any suitable and desired angle. In a set of embodiments the first groove extends into the insulation block at an angle of less than 90 degrees to the face of the insulation block in the direction in which the first insulation member extends from the (e.g. opening of the) first groove. In a set of embodiments the second groove extends into the insulation block at an angle of less than 90 degrees to the face of the insulation block in the direction in which the second insulation member extends from the (e.g. opening of the) second groove. Having the grooves extend at an acute angle means that the insulation members turn back on themselves into the respective grooves, against the electric field gradient, thus helping to prevent charge from migrating along the insulation block. This helps to reduce the risk of surface tracking owing to the increased electric field gradient.

The grooves may extend into the insulation block to any suitable and desired depth. In a set of embodiments the grooves extend at least 10 mm, e.g. at least 12 mm, into the insulation block.

The grooves may have any suitable and desired width (in a direction perpendicular to the directions in which the grooves extend across and into the insulation block), e.g. depending on the nature (e.g. solid or sheets) of the insulation members. In a set of embodiments the grooves across the full width of the insulation block. This allows the insulation members to extend across (and, e.g., beyond) the width of the insulation block. Thus, in one set of embodiments the insulation members extend (e.g. in a direction parallel to the direction in which the grooves extend) beyond the insulation block.

The first and second insulation members (e.g. set of insulation sheet(s)) may extend by any suitable and desired distance from the insulation block. The first insulation member preferably extends for a distance from the insulation block that is greater than or equal to the distance that the first side of live conductor extends from the set of electrodes. The first insulation member preferably extends for a distance from the insulation block that is greater than or equal to the distance that the ground conductor extends from the (e.g. first groove in the) insulation block in a direction parallel to the direction in which the first side of live conductor extends from the set of electrodes.

The second insulation member preferably extends for a distance from the insulation block that is greater than or equal to the distance that the second side of live conductor extends from the set of electrodes. The second insulation member preferably extends for a distance from the insulation block that is greater than or equal to the distance that the ground conductor extends from the (e.g. second groove in the) insulation block in a direction parallel to the direction in which the second side of live conductor extends from the set of electrodes.

The insulation members extending at least as far as the sides of the live conductor and/or at least as far as the ground conductor helps to increase the path length between the two sides of the live conductor around the insulation members, and between the live conductor and the ground conductor around the insulation members, to reduce the risk of surface tracking between the two sides of the live conductor and between the live conductor and the ground conductor.

The first and second sets of insulating sheet(s) may each comprise only a single insulating sheet. However, in a set of embodiments, the first and/or second sets of insulating sheets (e.g. each) comprises a plurality of insulating sheets (i.e. the first set of insulating sheets may have multiple sheets therein and/or the second set of insulating sheets may have multiple sheets therein). The plurality of insulation sheets in (e.g. each) of the first and/or second sets of insulation sheets preferably comprises at least four insulation sheets, e.g. at least six insulation sheets, e.g. approximately eight insulation sheets. The number of sheets in each set may depend on the working voltage, the thickness of the insulating members and/or the dielectric strength of the insulating members. Providing multiple sheets in each set of insulation sheets helps to increase the amount of insulation, which helps to reduce the risk of electrical punch-through between the live conductor and the ground conductor, e.g. for an electric field gradient of greater than 150 MV/m, and to help to reduce the risk surface tracking across the insulation member.

The first and second sets of insulating sheet(s) may have any suitable and desired geometry. Preferably (e.g. each of) the one or more insulating sheets in the first and second sets of insulating sheet(s) have a thickness (e.g. in a direction between the live conductor and the ground output conductor) less than 200 microns, e.g. less than 100 microns, e.g. approximately 75 microns. The Applicant has appreciated that a larger number of thinner insulation sheets helps to offer greater protection against electrical breakdown, while having little effect on the separation of the live conductor and the ground conductor.

The first and second sets of insulating sheet(s) may be made from any suitable and desired (dielectric) material, e.g. a thin film. In a preferred embodiment the first and second sets of insulating sheet(s) are made from a polyester, e.g. biaxially-oriented polyethylene terephthalate (boPET) such as Mylar®. Such a stretched thin film has a relatively high dielectric strength (thus providing a greater resistance to dielectric breakdown when subject to a high electric field) and is relatively durable and pliable (making it suitable for being manipulated when assembling the electrical switching arrangement, particularly for fitting into the grooves of the insulation block).

Figure 2:
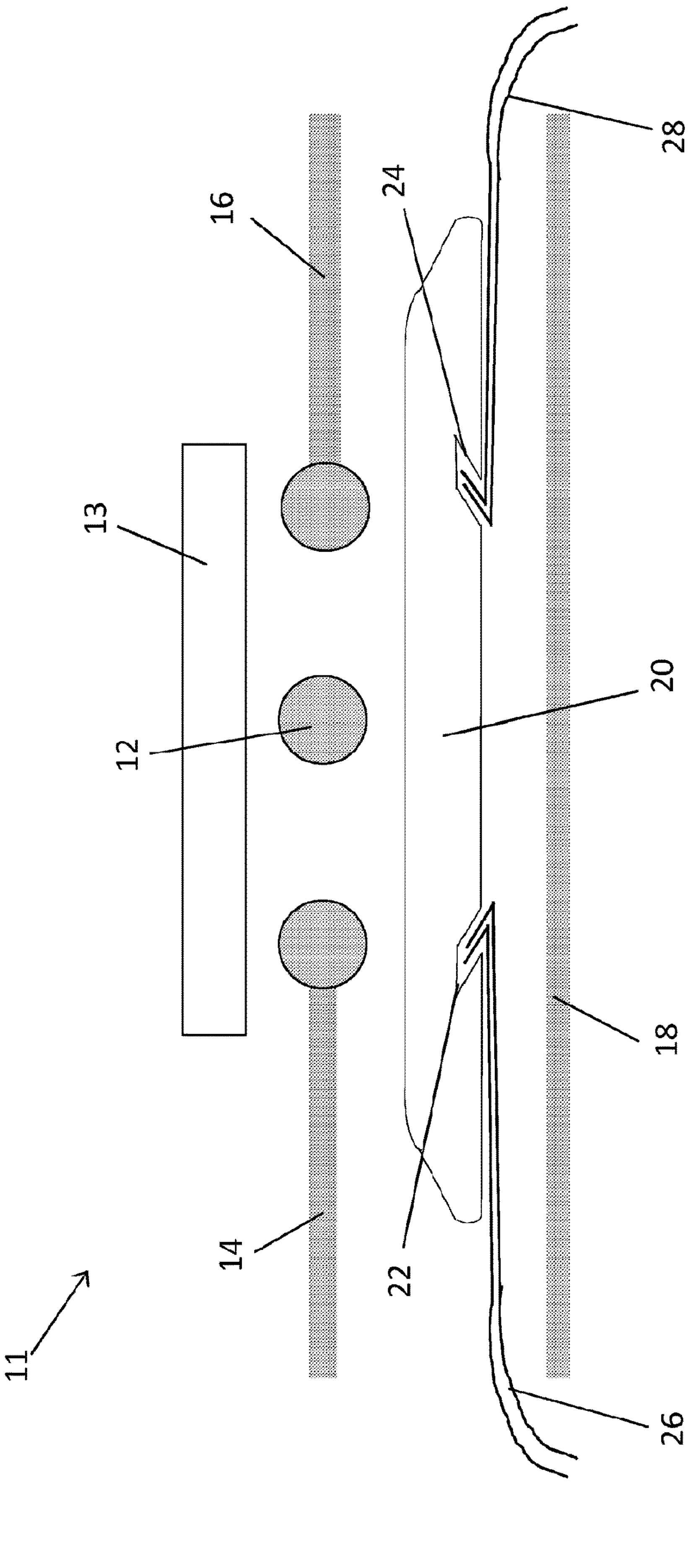

Certain preferred embodiments of the invention will now be described, by way of example only, with reference to the accompanying drawings in which:

FIG. 1 shows schematically a system for supplying a high voltage pulse to a load through an electrical switching arrangement in accordance with the present invention; and FIG. 2 shows schematically a cross-section of an electrical switching arrangement in accordance with an embodiment of the present invention.

Switching arrangements are important components in high voltage systems, e.g. when discharging a high voltage from a capacitor to deliver a high voltage pulse to a load. Embodiments of an electrical power supply and an electrical switching arrangement in accordance with the present invention will now be described.

FIG. 1 shows schematically an electrical power supply system 1 for supplying a high voltage pulse generated by a capacitor 4 to a load 6 through an electrical switching arrangement 2 in accordance with an embodiment of the present invention. The capacitor 4 (or array of capacitors) is connected to the electrical switching arrangement 2 (which comprises an array of spark ball gaps) by a first live conductor 8 and ground conductor 7. The load 6 is connected to the electrical switching arrangement 2 by a second live conductor 10 and ground conductor 9.

An embodiment of the electrical switching arrangement will now be described in more detail with reference to FIG. 2. FIG. 2 shows schematically a cross-section of an electrical switching arrangement 11 in accordance with an embodiment of the present invention.

The electrical switching arrangement 11 comprises an array of spark ball gaps 12 that connect a first side 14 and a second side 16 of a live conductor plate. The electrical switching arrangement 11 comprises a trigger 13 for triggering switching of the electrical switching arrangement 11.

The first side of the live conductor plate 14 connects the spark ball gaps 12 to the live output of a capacitor. The second side of the live conductor plate 16 connects the spark ball gaps 12 to a load. The electrical switching arrangement 11 also comprises a ground conductor plate 18 that extends across the electrical switching arrangement 11 between the capacitor and the load. The ground conductor plate 18 lies parallel to the first and second sides of the live conductor plate 14, 16.

A solid insulation block 20, formed from polyethylene, is positioned between the ground conductor plate 18 and the first and second sides of the live conductor plate 14, 16. The solid insulation block 20 is generally planar with tapered edges and two grooves 22, 24 formed in the side of the solid insulation block 20 that faces the ground conductor plate 18. The grooves 22, 24 extend into the thickness of the solid insulation block 20 at an acute angle and extend across the width of the solid insulation block 20, aligned with the sets of spark balls at the edges of the array of spark ball gaps 12.

A first set of eight 75 micron Mylar® insulation sheets 26 is folded into the first groove 22 of the insulation block 20. The first set of insulation sheets 26 extends from the first groove 22 along the surface of the insulation block 20 to and beyond the tapered edge of the insulation block 20. The first set of insulation sheets 26 extends from the edge of the ground conductor plate 18.

A second set of eight 75 micron Mylar® insulation sheets 28 is folded into the second groove 24 of the insulation block 20. The second set of insulation sheets 28 extends from the second groove 24 along the surface of the insulation block 20 to and beyond the tapered edge of the insulation block 20. The second set of insulation sheets 28 extends from the edge of the ground conductor plate 18.

The first and second insulation sheets 26, 28 coupled with the solid insulation block 20 provides a relatively low volume of insulation between the two sides of the live conductor plate 14, 16 and the ground conductor plate 18, thus helping to reduce the inductance of the electrical switching arrangement 11.

Operation of the electrical power supply and the electrical switching arrangement will now be described with reference to FIGS. 1 and 2.

To deliver a high voltage pulse from the capacitor 4 to the load 6 of the electrical power supply system 1, the capacitor 4 is first charged at a high voltage to store a large charge. As will be explained, the design of the electrical switching arrangement 11 shown in FIG. 2 helps to reduce the risk of dielectric breakdown of the charge on the capacitor, e.g. through the electrical switching arrangement 11.

As the capacitor 4 is being charged, the main route for dielectric breakdown (by surface tracking) between the first and second sides of the live conductor plate 14, 16 is via the side of the solid insulation block 20 that faces the ground conductor plate 18.

However, the route for any surface tracking is blocked by the first and second insulation sheets 26, 28 extending and folding into the first and second grooves 22, 24 of the solid insulation block 20. The first and second grooves 22, 24 and the first and second insulation sheets 26, 28 thus together form a trap for any surface tracking, thus reducing the risk of surface tracking via this route.

The first and second insulation sheets 26, 28 together with the solid insulation block 20 also provides a barrier between the first and second sides of the live conductor plate 14, 16 and the ground conductor plate 18. This reduces the risk of dielectric breakdown between these conductor plates 14, 16, 18.

When the capacitor 4 has been charged, the trigger 13 is energised to initiate corona discharge in the air between the spark balls of the spark ball gaps 12. This forms a conducting path across the spark ball gaps 12 between the first and second sides of the live conductor plate 14, 16 between the capacitor 4 and the load 6, thus allowing the capacitor 4 to discharge a high voltage and high current pulse through the electrical switching arrangement 11 to deliver to the load 6.

Owing to the reduced inductance of the electrical switching arrangement 11, the high voltage and high current pulse can be delivered quickly from the capacitor 4 to the load 6, through the electrical switching arrangement 11.

It will be seen from the above that, in at least preferred embodiments, the invention provides an electrical switching arrangement and electrical power supply that has a relatively low inductance while being able to be used to switch a high voltage and high current with a relatively low risk of dielectric breakdown and surface tracking.

The invention claimed is:

1. An electrical switching arrangement for an electrical power supply, the electrical switching arrangement comprising:

a live conductor, wherein the live conductor comprises a set of electrodes for switching between a first side of the live conductor and a second side of the live conductor;

a ground conductor;

an insulation block between the set of electrodes and the ground conductor;

a first insulation member extending from the insulation block on the first side of the set of electrodes; and a second insulation member extending from the insulation block on the second side of the set of electrodes;

wherein the insulation block comprises a first groove in which an edge of the first insulation member is located and a second groove in which an edge of the second insulation member is located.

2. The electrical switching arrangement as claimed in claim 1, wherein the live conductor comprises a live conducting plate and the ground conductor comprises a ground conducting plate.

3. The electrical switching arrangement as claimed in claim 1, wherein the first and second insulation members comprise a first set of one or more insulation sheets and a second set of one or more insulation sheets.

4. The electrical switching arrangement as claimed in claim 3, wherein the first set of one or more insulation sheets are folded and tucked into the first groove and the second set of one or more insulation sheets are folded and tucked into the second groove.

5. The electrical switching arrangement as claimed in claim 3, wherein the first and second sets of one or more insulating sheets are made from a polyester.

6. The electrical switching arrangement as claimed in claim 2, wherein the live conducting plate and the ground conducting plate are substantially parallel to each other.

7. The electrical switching arrangement as claimed in claim 1, wherein the set of electrodes comprises a spark gap.

8. The electrical switching arrangement as claimed in claim 1, wherein the set of electrodes comprises an array of spark ball gaps.

9. The electrical switching arrangement as claimed in claim 1, wherein the insulation block member is formed from polyethylene.

10. The electrical switching arrangement as claimed in claim 1, wherein the edges of the insulation block are tapered in a direction towards the respective edges.

11. The electrical switching arrangement as claimed in claim 1, wherein the first and second grooves are formed in a side of the insulation block facing the ground conductor.

12. The electrical switching arrangement as claimed in claim 1, wherein the first and second grooves extend in a direction perpendicular to the directions in which the first and second sides of the live conductor extend from the set of electrodes.

13. The electrical switching arrangement as claimed in claim 1, wherein the first groove extends into the insulation block at an angle of less than 90 degrees to the face of the insulation block in the direction in which the first insulation member extends from the first groove and the second groove extends into the insulation block at an angle of less than 90 degrees to the face of the insulation block in the direction in which the second insulation member extends from the second groove.

14. The electrical switching arrangement as claimed in claim 1, wherein the electrical switching device is arranged to connect a voltage source and a load, and the voltage source comprises one or more capacitors.

15. The electrical switching arrangement as claimed in claim 1, wherein the electrical switching arrangement is arranged to switch a voltage of at least 30 kV.

16. An electrical power supply for supplying an output voltage to a load, the electrical power supply comprising:

one or more capacitors for generating a voltage, wherein the one or more capacitors comprise:

a live terminal and a ground terminal; and an electrical switching arrangement for connecting the voltage generated by the one or more capacitors to the load, wherein the electrical switching arrangement comprises:

a live conductor connected to the live terminal of the capacitor, wherein the live conductor comprises a set of electrodes for switching between a first side of the live conductor and a second side of the live conductor;

a ground conductor connected to the ground terminal of the capacitor;

an insulation block between the set of electrodes and the ground conductor;

a first insulation member extending from the insulation block on the first side of the set of electrodes; and a second insulation member extending from the insulation block on the second side of the set of electrodes;

wherein the insulation block comprises a first groove in which an edge of the first insulation member is located and a second groove in which an edge of the second insulation member is located.

* * * * *